United States Patent
Chiang et al.

(10) Patent No.: US 8,808,891 B2
(45) Date of Patent: Aug. 19, 2014

(54) PORTABLE ELECTRONIC DEVICE WITH BATTERY COVER AND LATCH

(75) Inventors: Tsung-Ju Chiang, Taoyuan Shien (TW); Chih-Cheng Chang, Taipei County (TW); Cheng-Hsien Tsai, Taipei (TW)

(73) Assignee: Quanta Computer Inc., Taoyuan Shien (TW)

( * ) Notice: Subject to any disclaimer, the term of this patent is extended or adjusted under 35 U.S.C. 154(b) by 476 days.

(21) Appl. No.: 12/926,610

(22) Filed: Nov. 30, 2010

(65) Prior Publication Data

US 2012/0052355 A1   Mar. 1, 2012

(30) Foreign Application Priority Data

Aug. 26, 2010   (TW) ............................... 99216500 U

(51) Int. Cl.
*H01M 2/10* (2006.01)
*G06F 1/16* (2006.01)

(52) U.S. Cl.
CPC ........... *H01M 2/1066* (2013.01); *G06F 1/1635* (2013.01); *H01M 2/1022* (2013.01); *Y02E 60/12* (2013.01)

USPC ............................................... 429/96; 429/97

(58) Field of Classification Search
CPC ... H01M 2/10; H01M 2/1066; H01M 2/1022; G06F 1/1635; G06F 1/1656
USPC .......... 429/96, 97; 361/679.01; 292/137, 177, 292/121
See application file for complete search history.

(56) References Cited

U.S. PATENT DOCUMENTS

| | | | | |
|---|---|---|---|---|
| 5,645,954 | A | * | 7/1997 | Tamaru .......................... 429/100 |
| 2003/0035265 | A1 | * | 2/2003 | DeLuga ......................... 361/683 |
| 2010/0014221 | A1 | * | 1/2010 | Shi ............................ 361/679.01 |
| 2010/0109345 | A1 | * | 5/2010 | Wu et al. ......................... 292/19 |

* cited by examiner

*Primary Examiner* — Zachary Best
(74) *Attorney, Agent, or Firm* — Rabin & Berdo, P.C.

(57) ABSTRACT

A portable electronic device includes a main body, a battery module, at least a cover, a latch, a resilient member and a knob. The battery module is connected to the main body. At least a cover is connected to the main body. The latch is to lock or unlock the battery module and the at least a cover to the main body. The resilient member has an end connected with the latch for recovering the latch to an original position. The knob is connected to the latch and exposed by the main body for controlling the latch to lock or unlock the battery module and the at least a cover.

7 Claims, 9 Drawing Sheets

PORTABLE ELECTRONIC DEVICE WITH BATTERY COVER AND LATCH

RELATED APPLICATIONS

This application claims priority to Taiwan Application Serial Number 099216500, filed Aug. 26, 2010 which is herein incorporated by reference.

BACKGROUND

1. Field of Invention

The present invention relates to an electronic device. More particularly, the present invention relates to a portable electronic device.

2. Description of Related Art

A portable electronic device, e.g. a notebook computer, has multiple removable covers to be easily removed by users or engineers when some components inside the computers need to be replaced. In a conventional design, these removable covers are fastened to a case of the portable electronic device by means of bolts or screws. If these removable covers are not fastened by means of bolts or screws, at least a latch or the like are needed to fasten them. Each notebook computer is usually equipped with two or more removable covers, each cover needs at least two bolts, screws or latches to secure themselves.

For the companies who manufacture a huge number of notebooks, the costs of bolts, screws or latches are somewhat a large number of costs. For an assembly line of the companies who manufacture a huge number of notebooks, the more components each notebook has, the more labor costs the companies should pay for. All these cost issues should be carefully considered before designing a new notebook computer.

SUMMARY

It is therefore an objective of the present invention to provide a solution for the above-mentioned issues.

In accordance with the foregoing and other objectives of the present invention, a portable electronic device includes a main body, a battery module, at least a cover, a latch, a resilient member and a knob. The battery module is connected to the main body. At least a cover is connected to the main body. The latch is to lock or unlock the battery module and the at least a cover to the main body. The resilient member has an end connected with the latch for recovering the latch to an original position. The knob is connected to the latch and exposed by the main body for controlling the latch to lock or unlock the battery module and the at least a cover.

In an embodiment disclosed herein, the latch is slidably connected with the main body, and disposed between the battery module and the at least a cover.

In another embodiment disclosed herein, the resilient member has an opposite end connected with the main body.

In another embodiment disclosed herein, the latch has a first hook member and a second hook member on two opposite edges thereof, the first hook member is to fasten the battery module, and the second hook member is to fasten the at least a cover.

In another embodiment disclosed herein, the main body has a concave section on a bottom surface thereof, the knob is slidably connected within the concave section.

In another embodiment disclosed herein, the main body has a lower case, the knob and the latch are disposed on two opposite sides of the lower case and connected to each other through the lower case.

In another embodiment disclosed herein, the latch is slidably connected with the at least a cover.

In another embodiment disclosed herein, the latch has a hook member to fasten the battery module.

In another embodiment disclosed herein, the at least a cover has a concave section within which the knob is slidably connected.

In another embodiment disclosed herein, the knob and the latch are on two opposite sides of the cover and connected with each other through the cover.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 2A and 2B respectively illustrate enlarged views of the hook members in FIG. 2;

FIGS. 5A and 5B respectively illustrate enlarged views of the hook members in FIG. 4;

FIGS. 8A and 8B respectively illustrate enlarged views of the hook members in FIG. 8.

DESCRIPTION OF THE PREFERRED EMBODIMENTS

Figure 1:
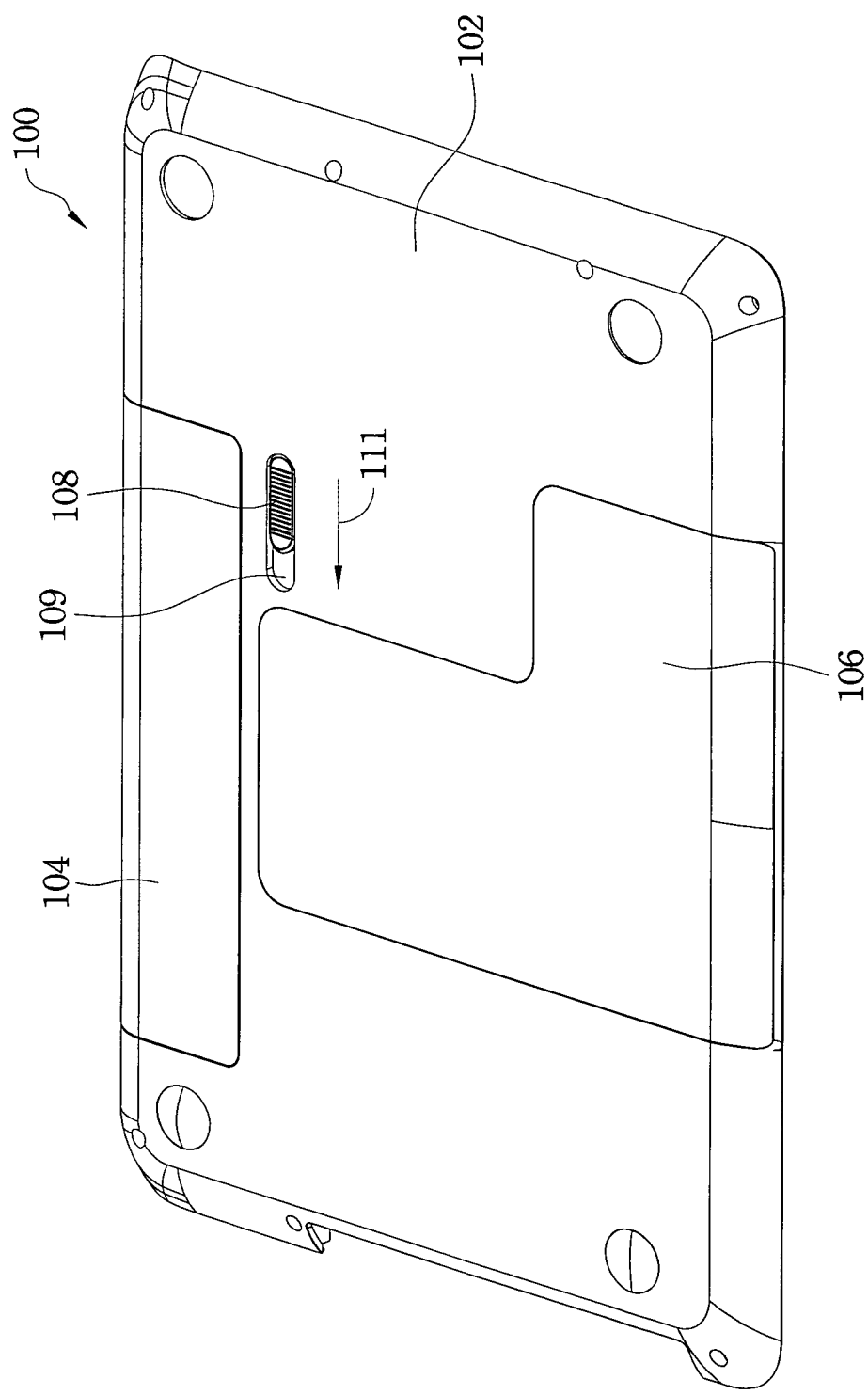
FIG. 1 illustrates a bottom view of a main body of a portable electronic device according to an embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

The present invention provides a single set of knob and latch to control a battery module and at least a covers, thereby reducing the number of the knobs and latches on a portable electronic device. The component costs and assembly costs can be thus decreased.

FIG. 1 illustrates a bottom view of a main body of a portable electronic device 100 according to an embodiment of this invention. In this embodiment, a battery module 104 and a cover 106 can be released from a lower case 102 by controlling the knob 108. The knob 108 is slidably connected within the concave section 109 of the lower case 102. When the knob 108 is moved along the direction 111, the battery module 104 and the cover 106 can be released from the lower case 102. The battery module 104 and the cover 106 can be separately released from the lower case 102 by sliding the knob 108 to two different positions within the concave section 109. For example, the knob 108 can be slid to a middle position of the concave section 109 to release the cover 106 from the lower case 102 first. When the knob 108 is slid to an opposite end of the concave section 109, the battery module 104 can be released from the lower case 102 after the cover 106 being released. In another example, the knob 108 can be slid to a middle position of the concave section 109 to release the battery module 104 from the lower case 102 first. When the knob 108 is slid to an opposite end of the concave section 109, the cover 106 can be released from the lower case 102 after the battery module 104 being released.

Figure 2:
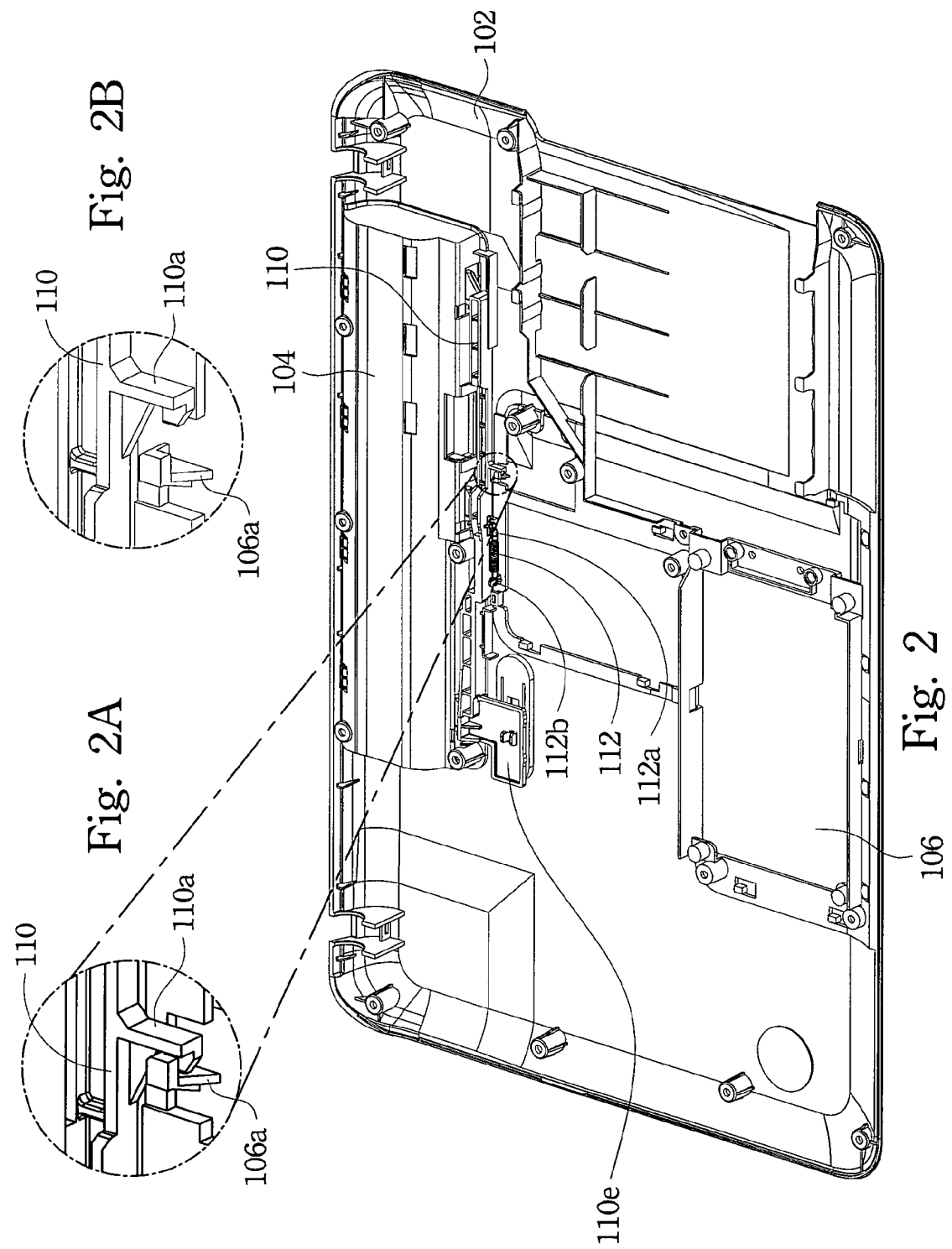
FIG. 2 illustrates a top view of a lower case removed from the main body in FIG. 1.

FIG. 2 illustrates a top view of the lower case 102, which is removed from the main body in FIG. 1. As illustrated in FIG. 1, the knob 108 is slid to move the latch 110 to lock or unlock the battery module 104 and cover 106. The latch 110 is slidably connected with the lower case 102, and located between the battery module 104 and the cover 106. A resilient member 112 (e.g. an extension spring) provides a force to pull the latch 110 for fastening the battery module 104 or cover 106. The resilient member 112 has an end 112a connected to the latch 110 and an opposite end 112b connected to the lower case 102. When a user does not apply a force on the knob 108, the latch 110 and knob 108 can be returned to an original position by means of resilient member 112. One end of the latch 110 has a connection member 110e to be connected with the knob 108 through (an opening of) the lower case 102. Thus, the knob 104 and the latch 110 can slide together and simultaneously to lock or unlock the battery module 104 or cover 106. As illustrated in FIG. 2A, a hook member 110a of the latch 110 engages with a hook member 106a of the cover 106 so as to lock (or fasten) the cover 106 on the lower case 102. As illustrated in FIG. 2B, the hook member 110a disengages with the hook member 106a, the cover 106 can be released from the lower case 102.

Figure 3:
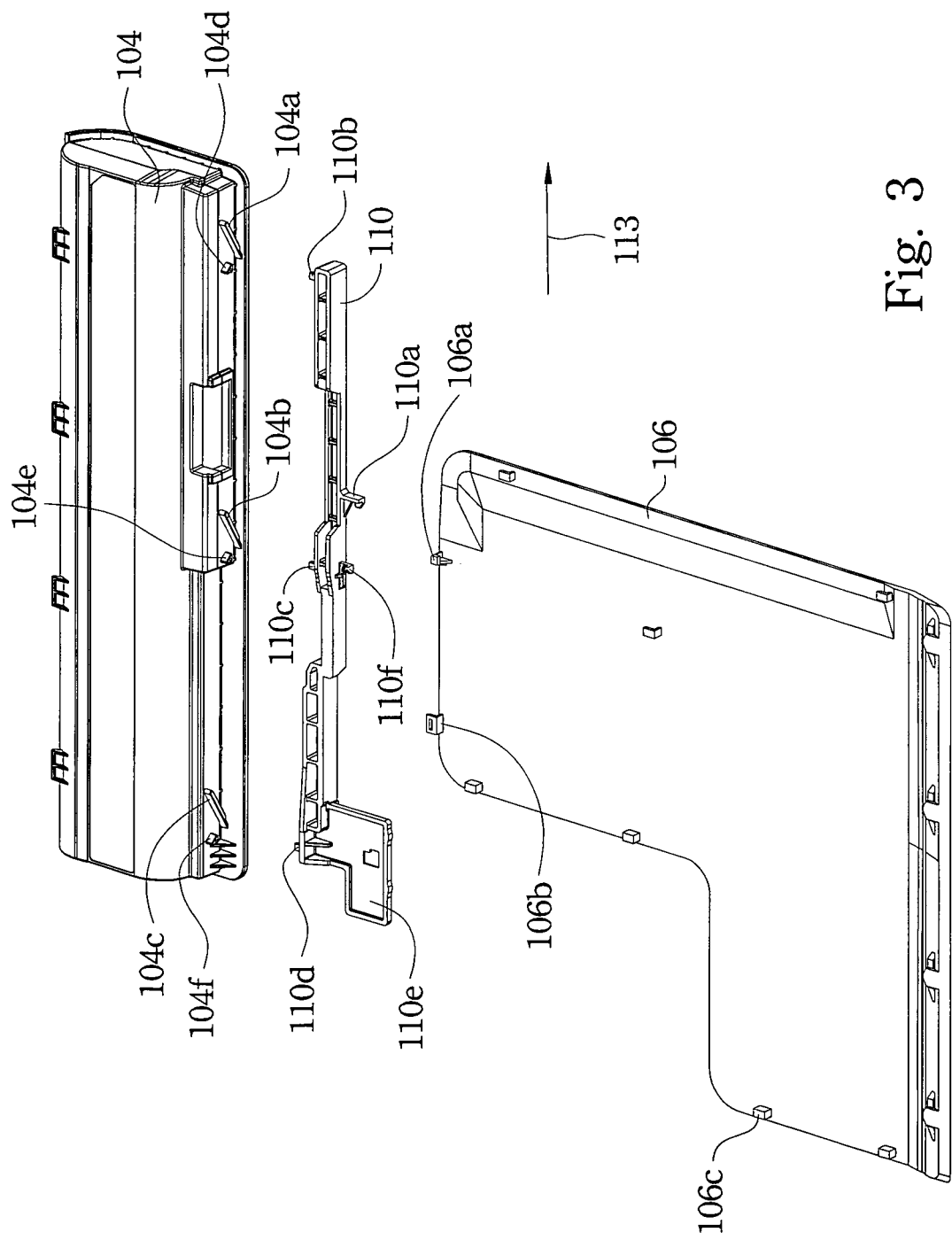
FIG. 3 illustrates the battery module, latch and cover of FIG. 2 separately.

FIG. 3 illustrates the battery module, latch and cover of FIG. 2 separately. The latch 110 has multiple hook members at two opposite sides thereof so as to lock or unlock the battery module 104 and cover 106. For example, the hook members (110b, 110c, 110d) are at a side of the latch 110 to fasten the battery module 104, and the hook member 110a is at an opposite side of the latch 110 to fasten the cover 106. The hook members (110b, 110c, 110d) of the latch 110 respectively engage with hook members (104d, 104e, 104f) of the battery module 104 to fasten the battery module 104. The latch 110 has a connection hook 110f to be connected with an end of the resilient member 112. The battery module 104 has lifting members (104a, 104b, 104c), which are located adjacent to the hook members (104d, 104e, 104f) respectively. When the hook members (110b, 110c, 110d) of the latch 110 are in respective contact with the lifting members (104a, 104b, 104c) of the battery module 104 and the latch 110 slides along a direction 113, an edge of the battery module 104 can be lifted to protrude out of a bottom surface of the lower case 102 as illustrated in FIG. 1 for users to easily remove the battery module 104 from the lower case 102. Besides, the hook member 110a of the latch 110 is to engage with the hook member 106a of the cover 106 so as to fasten the cover 106. In order to secure the cover 106 reliably, several positioning members (e.g. positioning members 106b, 106c) are designed at the edges of the cover 106 to be used with the hook member 106a.

Figure 4:
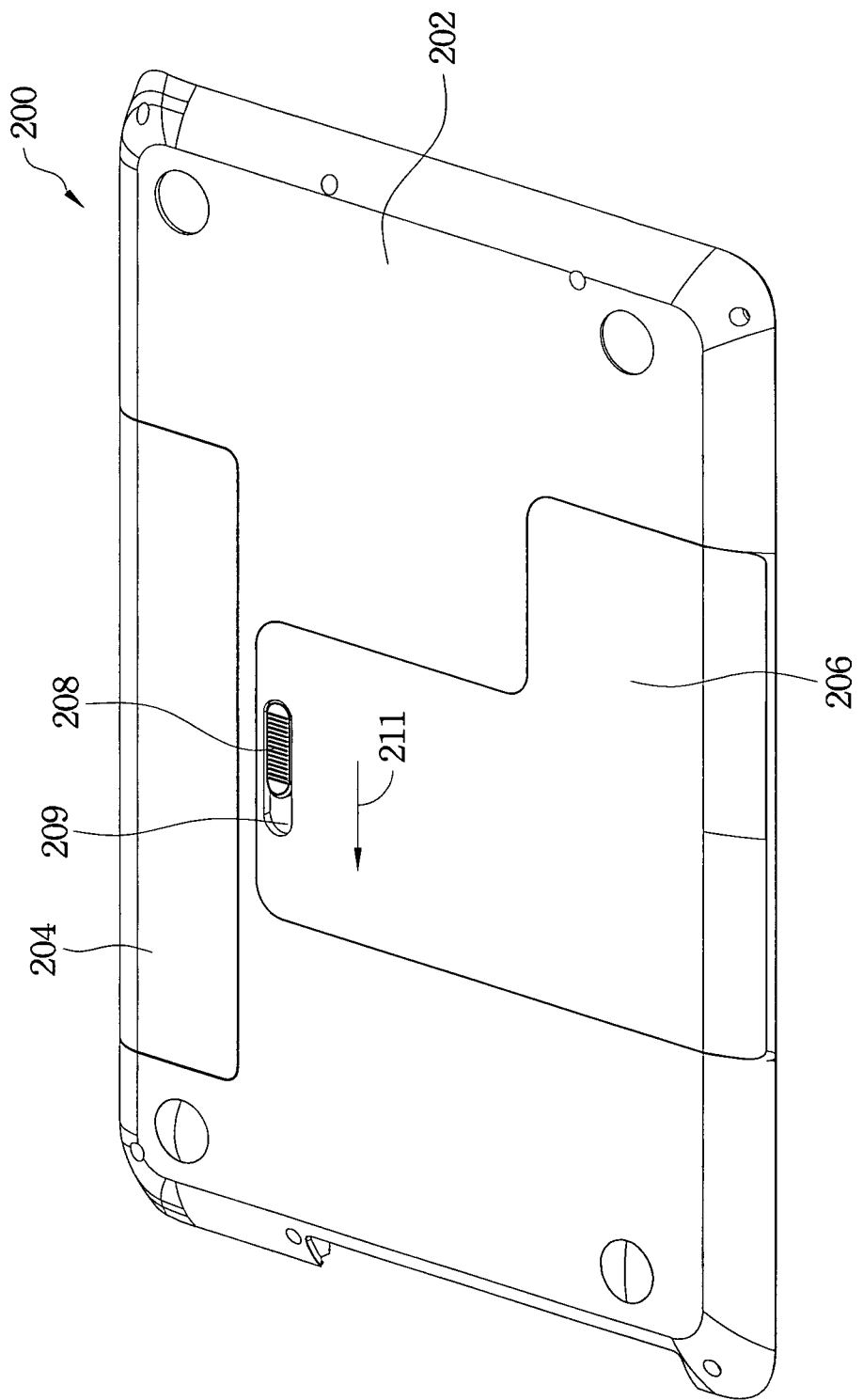
FIG. 4 illustrates a bottom view of a main body of a portable electronic device according to another embodiment of this invention.

FIG. 4 illustrates a bottom view of a main body of a portable electronic device 200 according to another embodiment of this invention. In this embodiment, a battery module 204 and a cover 206 can be released from a lower case 202 by controlling the knob 208. This embodiment is different from the embodiment of FIGS. 1-3 in the positions of the knob and latch. In this embodiment, the knob 208 is slidably connected within the concave section 209 of the cover 206. When the knob 208 is moved along the direction 211, the battery module 204 and the cover 206 can be released from the lower case 202.

Figure 5:
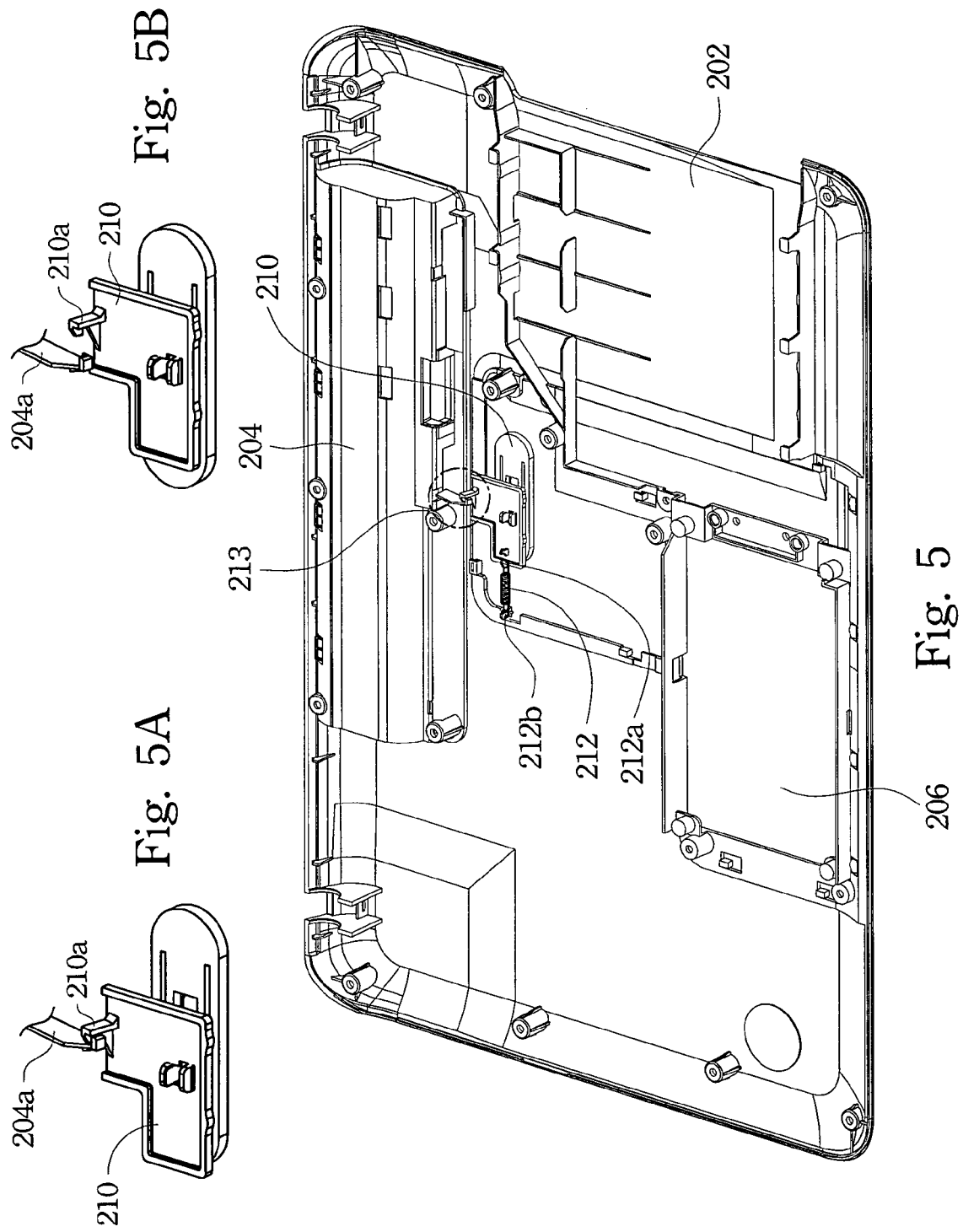
FIG. 5 illustrates a top view of a lower case removed from the main body in FIG. 4.

FIG. 5 illustrates a top view of the lower case 202, which is removed from the main body in FIG. 4. As illustrated in FIG. 4, the knob 208 is slid to move the latch 210 to lock or unlock the battery module 204 and cover 206. The latch 210 is slidably connected with the cover 206. A resilient member 212 (e.g. an extension spring) provides a force to pull the latch 210 for fastening the battery module 204 or cover 206. The resilient member 212 has an end 212a connected to the latch 210 and an opposite end 212b connected to the cover 206. When a user does not apply a force on the knob 208, the latch 210 and knob 208 can be returned to an original position by means of the resilient member 212. One end of the latch 210 is connected with the knob 208 through (an opening of) the lower case 202 (referring to FIG. 4). Thus, the knob 208 and the latch 210 can slide together and simultaneously to lock or unlock the battery module 204 or cover 206. As illustrated in FIG. 5A (an enlarged view of the section 213), a hook member 210a of the latch 210 engages with a hook member 204a of the battery module 204 so as to lock (or fasten) the cover 206 and the battery 204 on the lower case 202. As illustrated in FIG. 5B, the hook member 210a disengages with the hook member 204a, the cover 206 and the battery 204 can be thus released from the lower case 202.

Figure 6:
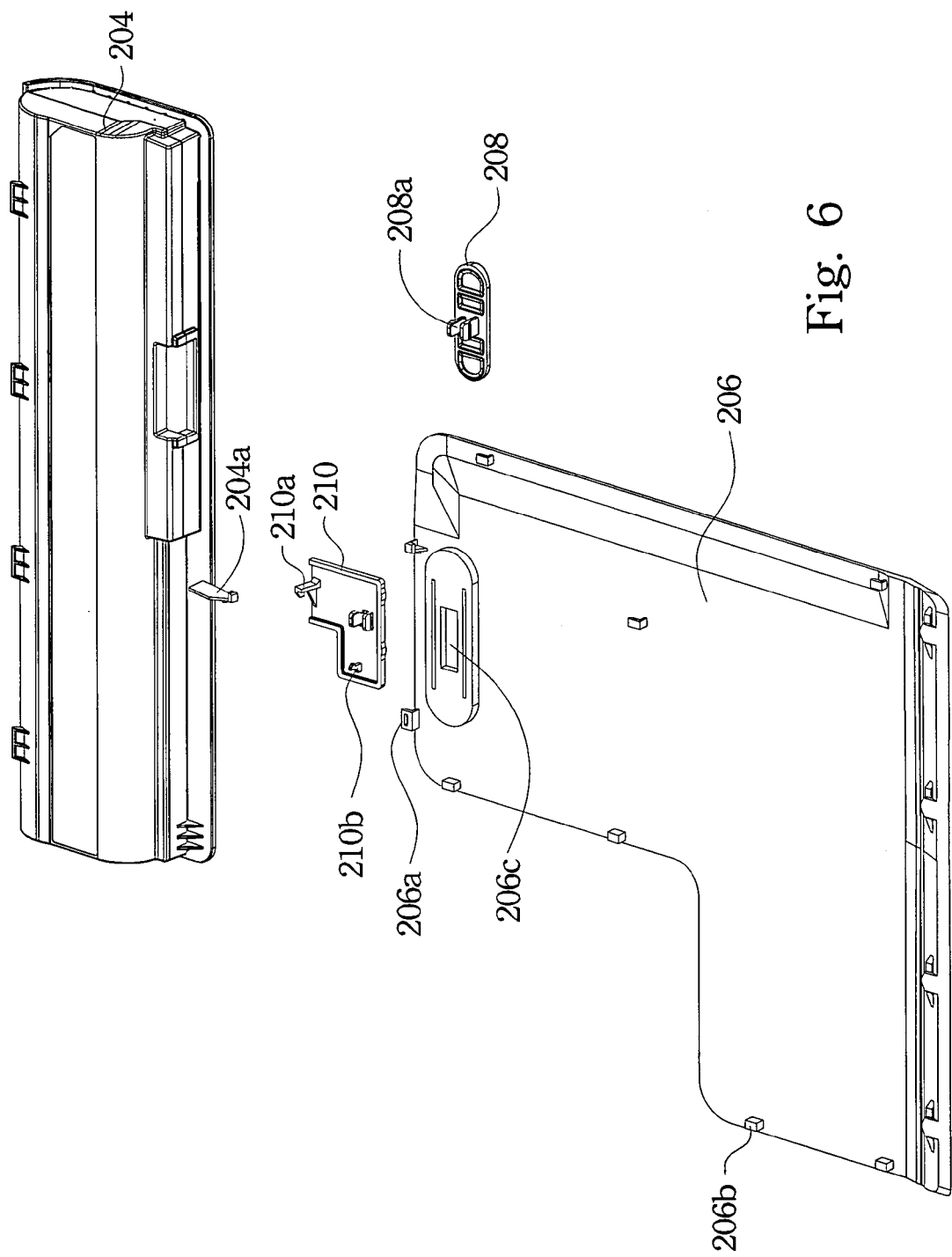
FIG. 6 illustrates the battery module, latch and cover of FIG. 5 separately.

FIG. 6 illustrates the battery module, latch and cover of FIG. 5 separately. The latch 210 has a hook member 210a to engage with a hook member 204a of the battery module 204 so as to fasten both the battery module 204 and the cover 206. The knob 208 has a pair of connection members 208a to be connected with the latch 210 through openings 206c of the cover 206 such that the knob 208 and latch 210 can be slid together and simultaneously. In order to secure the cover 206 reliably, several positioning members (e.g. positioning members 206a, 206b) are designed at the edges of the cover 206 to be used with the hook member 210a. The latch 210 has a connection hook 210b to be connected with an end 212a of the resilient member 212 (referring to FIG. 5).

Figure 7:
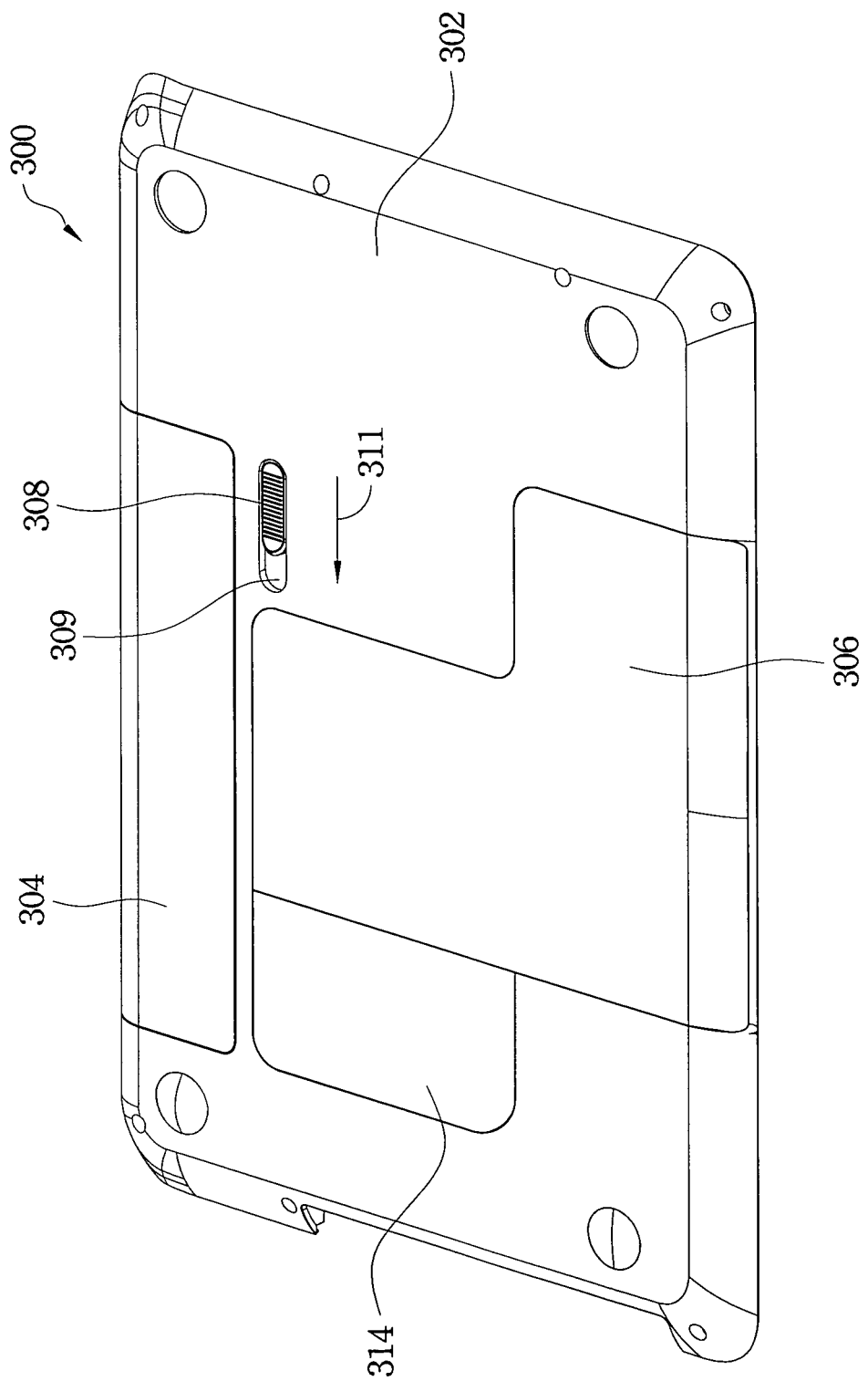
FIG. 7 illustrates a bottom view of a main body of a portable electronic device according to still another embodiment of this invention.

FIG. 7 illustrates a bottom view of a main body of a portable electronic device 300 according to still another embodiment of this invention. This embodiment is different from the embodiment of FIGS. 1-3 mainly in the number of the covers. In this embodiment, a battery module 304 and two covers 306, 314 can be released from a lower case 302 by controlling a knob 308. The knob 308 is slidably connected within the concave section 309 of the lower case 302. When the knob 308 is moved along the direction 311, the battery module 304 and the covers 306, 314 can be released from the lower case 302. The battery module 304 and the covers 306, 314 can be separately released from the lower case 302 by sliding the knob 308 to multiple different positions within the concave section 309. For example, the knob 308 can be slid to a middle position of the concave section 309 to release the covers 306, 314 from the lower case 302 first. When the knob 308 is slid to an opposite end of the concave section 309, the battery module 304 can be released from the lower case 302 after the cover 306 being released. In alternate example, the knob 308 can be slid to a middle position of the concave section 309 to release the battery module 304 from the lower case 302 first. When the knob 308 is slid to an opposite end of the concave section 309, the covers 306, 314 can be released from the lower case 302 after the battery module 304 being released.

Figure 8:
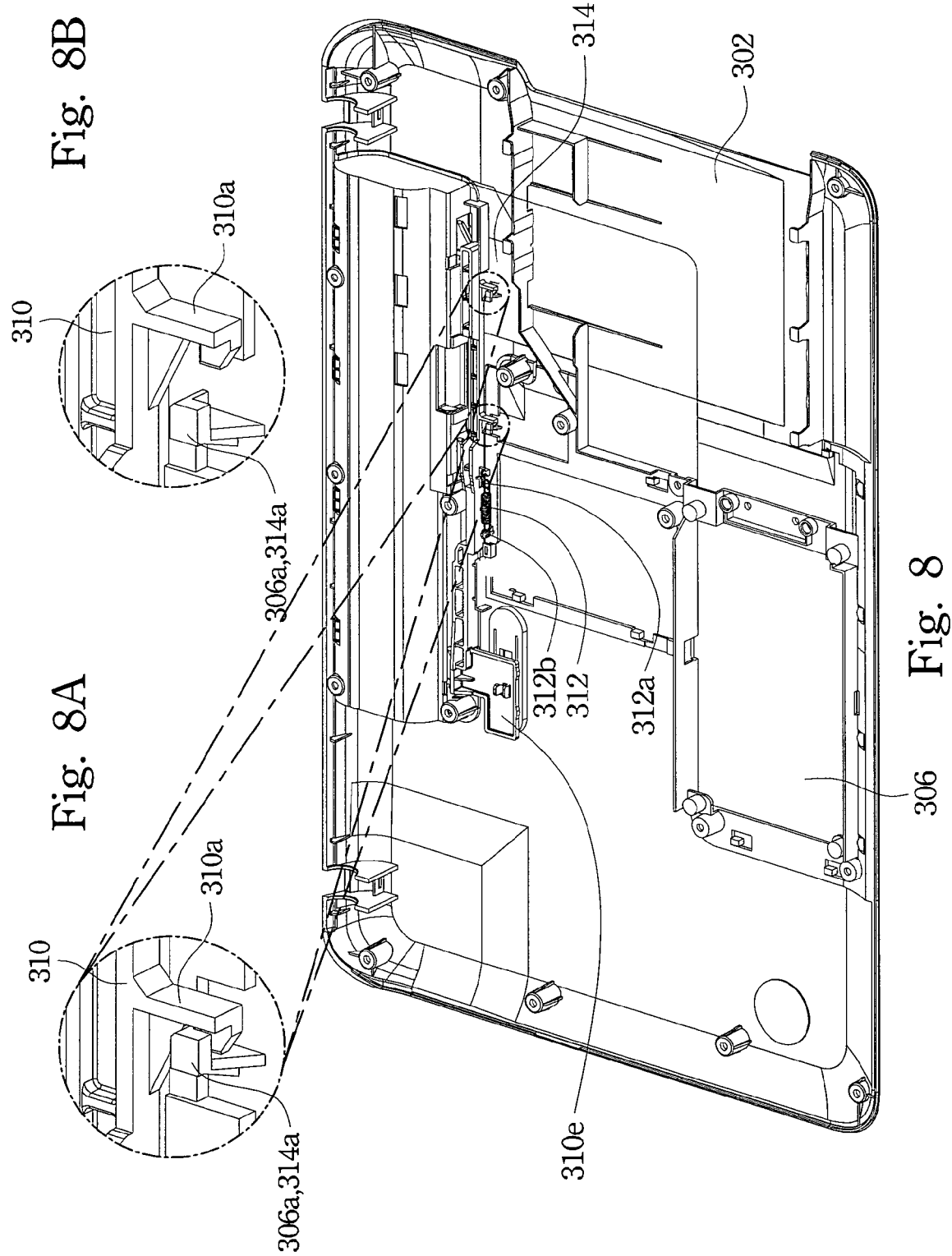
FIG. 8 illustrates a top view of a lower case removed from the main body in FIG. 7.

FIG. 8 illustrates a top view of the lower case 302, which is removed from the main body in FIG. 7. As illustrated in FIG. 7, the knob 308 is slid to move the latch 310 to lock or unlock the battery module 304 and covers 306, 314. The latch 310 is slidably connected with the lower case 302, and located between the battery module 304 and the covers 306, 314. A resilient member 312 (e.g. an extension spring) provides a force to pull the latch 310 for fastening the battery module 304 or covers 306, 314. The resilient member 312 has an end 312a connected to the latch 310 and an opposite end 312b connected to the lower case 302. When a user does not apply a force on the knob 308, the latch 310 and knob 308 can be returned to an original position by means of the resilient member 312. One end of the latch 310 has a connection member 310e to be connected with the knob 308 through (an opening of) the lower case 302. Thus, the knob 304 and the latch 310 can slide together to lock or unlock the battery module 304 or covers 306, 314. As illustrated in FIG. 8A, two hook members 310a of the latch 310 respectively engages with a hook member 306a of the cover 306 and a hook member 314a of the cover 314 so as to lock (or fasten) the covers 306, 314 on the lower case 302. As illustrated in FIG. 8B, two hook members 310a respectively disengages with the hook members 306a, 314a, the covers 306, 314 can be released from the lower case 302.

Figure 9:
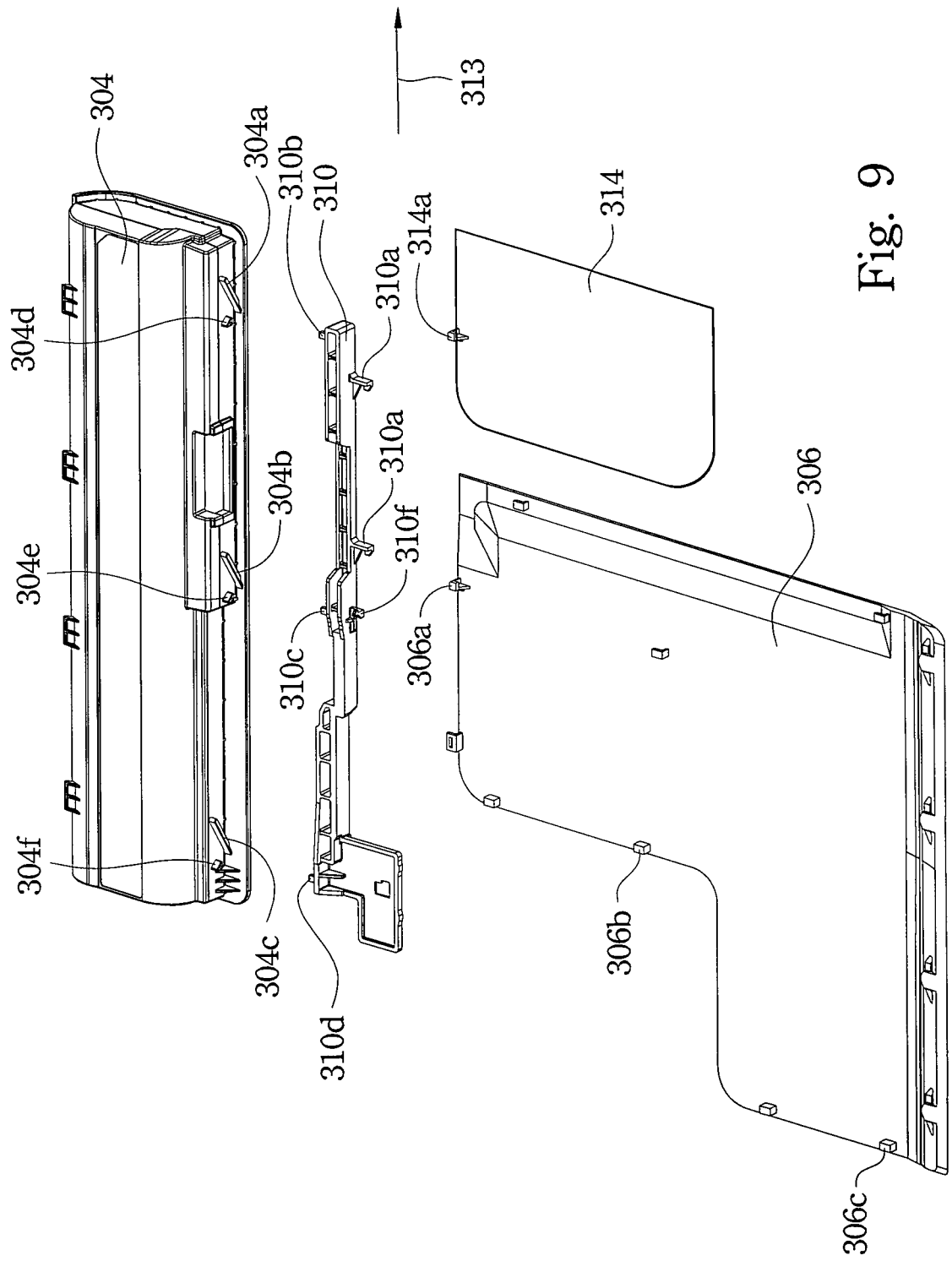
FIG. 9 illustrates the battery module, latch and cover of FIG. 8 separately.

FIG. 9 illustrates the battery module, latch and cover of FIG. 8 separately. The latch 310 has multiple hook members at two opposite sides thereof so as to lock or unlock the battery module 304 and covers 306, 314. For example, the hook members (310b, 310c, 310d) are at a side of the latch 310 to fasten the battery module 304, and two hook members 310a are at an opposite side of the latch 310 to fasten the covers 306, 314. The hook members (310b, 310c, 310d) of the latch 310 respectively engage with hook members (304d, 304e, 304f) of the battery module 304 to fasten the battery module 304. The latch 310 has a connection hook 310f to be connected with an end of the resilient member 312. The battery module 304 has lifting members (304a, 304b, 304c), which are located adjacent to the hook members (304d, 304e, 304f). When the hook members (310b, 310c, 310d) of the latch 310 are in contact with the lifting members (304a, 304b, 304c) of the battery module 304 and the latch 310 slides along a direction 313, an edge of the battery module 304 can be lifted to protrude out of a bottom surface of the lower case 302 as illustrated in FIG. 7 for users to easily remove the battery module 304 from the lower case 302. Besides, the two hook members 310a of the latch 310 is to engage with the hook member 306a of the cover 306 and the hook member 314a of the cover 314 so as to fasten the covers 306, 314. In order to secure the covers 306, 314 reliably, several positioning member (e.g. positioning members 306b, 306c) are designed at the edges of the covers 306, 314 to be used with the hook member 306a.

According to the discussed embodiments, the present invention provides a single set of knob and latch to control a battery module and at least one cover, thereby reducing the number of the knobs and latches on a portable electronic device. The component costs and labor costs for assembling a portable electronic device can be thus decreased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device comprising:
a main body;
a battery module connected to the main body to cover a first surface section of the main body;
a cover connected to the main body to cover a second surface section of the main body different from the first surface section, the first surface section being not overlapped with the second surface section;
a latch for locking or unlocking the battery module and the cover to the main body, the latch being slidably connected with the main body, and being disposed between the battery module and the cover, wherein the latch has a first hook member and a second hook member on two opposite edges thereof, the first hook member is to fasten the battery module, the second hook member is to fasten the cover;
a resilient member having an end connected with the latch for recovering the latch to an original position; and
a knob connected to the latch and slidably connected within a concave section of the main body for controlling the latch to lock or unlock the battery module and the cover.

2. The portable electronic device of claim 1, wherein the resilient member has an opposite end connected with the main body.

3. The portable electronic device of claim 1, wherein the main body has a lower case, the knob and the latch are disposed on two opposite sides of the lower case and connected to each other through the lower case.

4. The portable electronic device of claim 1, wherein the latch is slidably connected with the cover.

5. The portable electronic device of claim 4, wherein the latch has a hook member to fasten the battery module.

6. The portable electronic device of claim 4, wherein the cover has a concave section within which the knob is slidably connected.

7. The portable electronic device of claim 6, wherein the knob and the latch are on two opposite sides of the cover and connected with each other through the cover.

* * * * *